United States Patent
Popescu

(10) Patent No.: US 8,023,917 B2
(45) Date of Patent: Sep. 20, 2011

(54) FM TONE REJECTION

(75) Inventor: Andrei Barbu Popescu, Cambridge (GB)

(73) Assignee: Cambridge Silicon Radio Limited, Cambridge (GB)

(*) Notice: Subject to any disclaimer, the term of this patent is extended or adjusted under 35 U.S.C. 154(b) by 570 days.

(21) Appl. No.: 12/161,378

(22) PCT Filed: Jan. 18, 2007

(86) PCT No.: PCT/GB2007/000133
§ 371 (c)(1),
(2), (4) Date: Sep. 10, 2008

(87) PCT Pub. No.: WO2007/083107
PCT Pub. Date: Jul. 26, 2007

(65) Prior Publication Data
US 2010/0219876 A1    Sep. 2, 2010

(51) Int. Cl.
*H04B 1/10* (2006.01)
*H04B 1/00* (2006.01)

(52) U.S. Cl. .............. 455/296; 455/67.11; 455/63.1; 375/130

(58) Field of Classification Search .............. 455/296, 455/297, 298–302, 67.11–67.14, 226.1–226.4; 375/146, 147, 141, 130, 346, E1.001, 348, 375/E1.023, E7.068
See application file for complete search history.

(56) References Cited

U.S. PATENT DOCUMENTS

| | | | |
|---|---|---|---|
| 4,027,264 A | 5/1977 | Gutleber | |
| 5,307,517 A | 4/1994 | Rich | |
| 5,570,395 A | 10/1996 | Myers | |
| 5,644,592 A * | 7/1997 | Divsalar et al. | 375/147 |
| 6,834,073 B1 * | 12/2004 | Miller et al. | 375/130 |
| 6,937,871 B2 | 8/2005 | Dick | |
| 7,787,572 B2 * | 8/2010 | Scharf et al. | 455/67.13 |
| 2007/0211786 A1 * | 9/2007 | Shattil | 375/146 |

OTHER PUBLICATIONS

Rich et al., "Co-channel FM Interference Suppression Using Adaptive Notch Filters," IEEE Transactions on Communications, Jul. 1, 1994, pp. 2384-2389, vol. 42, No. 7, IEEE Service Center, Piscataway, NJ.

* cited by examiner

*Primary Examiner* — Lana Le
(74) *Attorney, Agent, or Firm* — Novak Druce DeLuca + Quigg LLP

(57) ABSTRACT

An interference rejection unit for at least partially rejecting a narrowband interferer from an input signal, the unit comprising: an interferer detector for detecting the phase of an interferer in the input signal; a signal generator for generating a cancellation signal in dependence on the phase detected by the interferer detector; and a signal combiner for combining the input signal with the tone cancellation signal to generate an output signal in which the interferer is at least partially cancelled from the input signal.

17 Claims, 4 Drawing Sheets

FM TONE REJECTION

This invention relates to the removal of unwanted interference, especially narrowband interference, from a signal that also contains a wanted frequency modulated signal. One example of an application of a circuit according to the invention is the removal of an interfering tone from a received radio signal.

Frequency modulation (FM) radio receivers are prone to interference. In order to maximise range modern FM radio receivers are very sensitive. For example commercial FM receivers of the types used in equipment such as broadcast radio receivers and mobile phones can have sensitivities of around −107 dBm. Such receivers are vulnerable to even relatively weak interference.

There is a trend to combine FM receivers with multiple other functions into devices that have a single compact housing. Examples are portable music players that include broadcast radio receivers and hard disk drives and mobile phones that include short range radio transceivers and cameras. The fact that many components are packed into a small volume in such devices means that there is a significant possibility of interference between the components. The performance of a radio receiver in such a device can be significantly degraded by interference from other components in the device. Harmonics of clocks within the device constitute a particular source of interference which can leak through electromagnetic coupling to other components of the device.

Interfering signals (interferers) in this context are commonly of a repetitive (cyclic) form. Such cyclic interferers have multiple harmonics, but due to the relatively small ratio of channel bandwidth to carrier frequency, it is common that only a single harmonic falls within a given FM channel. After the typical filtering that a receiver applies to select the wanted channel, such a harmonic appears as a sinusoid (tone). It is common for the frequency and phase of such a tone (as observed by the FM receiver) to vary slowly over time, especially if the receiver and the source of interference use different clock references. In this sense, such a tone is not pure; it is more accurately described as a narrowband signal. This is the understanding of the term 'tone interferer' in the context of this invention. Tone interferers added to an FM signal can significantly degrade the quality of the data that can be recovered from the signal. In the case of an FM broadcast signal, for example, a tone interferer that is greater in magnitude than the received signal will completely swamp (block) the signal, and even a tone interferer 20 dB smaller than the received signal can create a noticeable distortion of the audio data that is recovered.

Many techniques for removing tone interference from signals are known. U.S. Pat. No. 4,027,264, discloses the use of a PLL (phase lock loop) to cancel tone interference. The PLL is used to detect a tone interferer in an input signal and to synchronise to its phase. The output of the PLL drives an oscillator which generates a tone signal of the same phase and frequency as the detected interferer. That is subtracted from the input signal to form an output signal. A null detector detects the amplitude of the interferer in the output signal and controls amplification of the generated tone signal so as to cause the tone interferer to be cancelled in the output signal. This circuit suffers from a number of problems. First, it is not generally suitable for use when the wanted signal is an FM signal. The spectrum of FM signals can have strong components at or near the interferer frequency. These can cause a substantial perturbation of the signal-free interferer estimate provided by the PLL, thus degrading the quality of the output signal. Another shortcoming of this scheme is that it is targeted at an analogue implementation and is not readily suitable for digital implementation.

The prior art also includes adaptive noise cancelling techniques; a survey of such techniques is found in the article "Adaptive Noise Cancelling: Principles and Applications" by Widrow at al, Proc IEEE, Vol. 63, No. 12, December 1975. For best performance, such adaptive cancellation requires the availability of a reference signal correlated with the interferer and not correlated with the wanted signal. Making such a reference signal available can be costly and is not always possible or practical. For rejecting narrowband interferers, it is possible to use a delayed version of the input signal as a reference signal, but then this type of adaptive scheme is susceptible to also notch out wanted signal frequency contents around the interferer frequency.

Techniques using notch filters (also known as 'stop' or 'trap' filters) in the wanted signal path, such as disclosed in U.S. Pat. No. 4,453,137, are not preferred because they cause a degradation of the wanted signal by removing part of its spectrum.

Finally, the prior art includes techniques for separating multiple co-channel FM signals, beginning with the pioneering work by E. J. Baghdady (U.S. Pat. No. 3,911,366). Other references falling in this category are U.S. Pat. No. 4,992,747 and U.S. Pat. No. 5,570,395 of G. A. Myers, and U.S. Pat. No. 5,307,517 of D. A. Rich, making use of PLL demodulators. These techniques can address the separation of a tone interferer from an FM signal as a special case. However, they are unnecessarily complicated and not specially suited for this particular purpose.

None of the known techniques described above provides for very high quality rejection of tones from a typical FM broadcast signal with simple processing suitable for digital implementation. There is therefore a need for an improved method for removal of tone interferers from an FM signal.

According to the present invention there is provided an interference rejection unit for at least partially rejecting an interferer from an input signal, the unit comprising: an interferer detector for detecting the phase of an interferer in the input signal; a signal generator for generating a cancellation signal in dependence on the phase detected by the interferer detector; a signal combiner for combining the input signal with the cancellation signal to generate an output signal in which the interferer is at least partially cancelled from the input signal; a wanted signal estimator for forming a first estimate signal by filtering the input signal or a signal generated in dependence on the input signal to selectively reject therefrom signals of the form of the interferer; and an interferer estimator for forming a second estimate signal by cancelling the first estimate signal from the input signal; and wherein the interferer detector is arranged to detect the phase of the interferer in the input signal by detecting the phase of the interferer in the second estimate signal.

According to the present invention from a second aspect there is provided a method for operating an interference rejection unit for at least partially rejecting an interferer from an input signal, the method comprising: detecting the phase of an interferer in the input signal; generating a cancellation signal in dependence on the phase detected by the interferer detector; combining the input signal with the cancellation signal to generate an output signal in which the interferer is at least partially cancelled from the input signal; forming a first estimate signal by filtering the input signal or a signal generated in dependence on the input signal to selectively reject therefrom signals of the form of the interferer; and forming a second estimate signal by cancelling the first estimate signal from the input signal; the step of detecting the phase of an interferer in the input signal comprising detecting the phase of the interferer in the second estimate signal.

Preferably the wanted signal estimator is arranged to form an estimate of the amplitude of the output signal and to form the first estimate signal such that its amplitude is dependent on the estimate of the amplitude of the output signal. Preferably the wanted signal estimator is arranged to form the first estimate signal such that its amplitude is equal to the estimated amplitude of the output signal.

Preferably the interferer detector is capable of detecting the frequency of the interferer in the input signal, most preferably by detecting the frequency of the interferer in the second estimate signal.

Preferably the signal estimator comprises, a filter for filtering the input signal or the signal generated in dependence on the input signal to selectively reject therefrom signals of the form of the interferer; the filter being an adjustable notch filter arranged to selectively filter signals at the frequency detected by the interferer detector.

Preferably the signal generator is arranged to generate the cancellation signal at the frequency detected by the interferer detector.

Preferably the interferer detector is capable of detecting the amplitude of the interferer in the input signal, most preferably by detecting the amplitude of the interferer in the second estimate signal.

Preferably the signal generator is arranged to combine the input signal and the cancellation signal at relative strengths dependent on the amplitude detected by the interferer detector.

The input signal may contain a frequency modulated signal.

The interference rejection unit may be arranged to, whilst the modulation index of the input signal is below a predetermined threshold, hold the estimate of the amplitude of the output signal at a constant value.

The interference rejection unit may be arranged to, whilst the modulation index of the input signal is below a predetermined threshold, hold the relative strengths at which the input signal and the cancellation signal are combined at a constant value.

The interferer may be a narrowband interferer. The interferer may be a periodic interferer. The interferer may be a tone interferer, for example of a sinusoidal or substantially sinusoidal form.

The interference rejection unit could be constrained to reject only an interferer whose frequency lies in a pre-set frequency range. This could be achieved by the interferer detector being constrained to detect the phase of only interferers whose frequencies lie in a pre-set frequency range.

According to a third aspect of the present invention there is provided a signal receiver comprising an interference rejection unit as set out above. The receiver may include a carrier detector for detecting a wanted carrier in the output signal. The interference rejection unit may be arranged to take the modulation index of the input signal to be below the predetermined threshold when the carrier detector does not detect a wanted carrier in the output signal.

The present invention will now be described by way of example with reference to the accompanying drawings.

Figure 1:
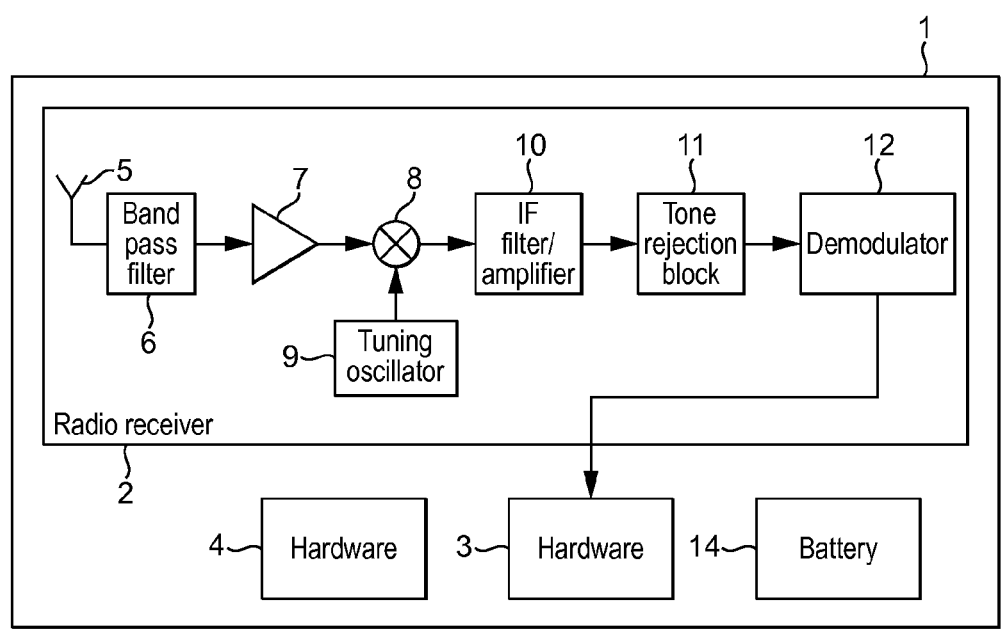
FIG. 1 shows a radio receiver device including a tone rejection block.
Figure 2:
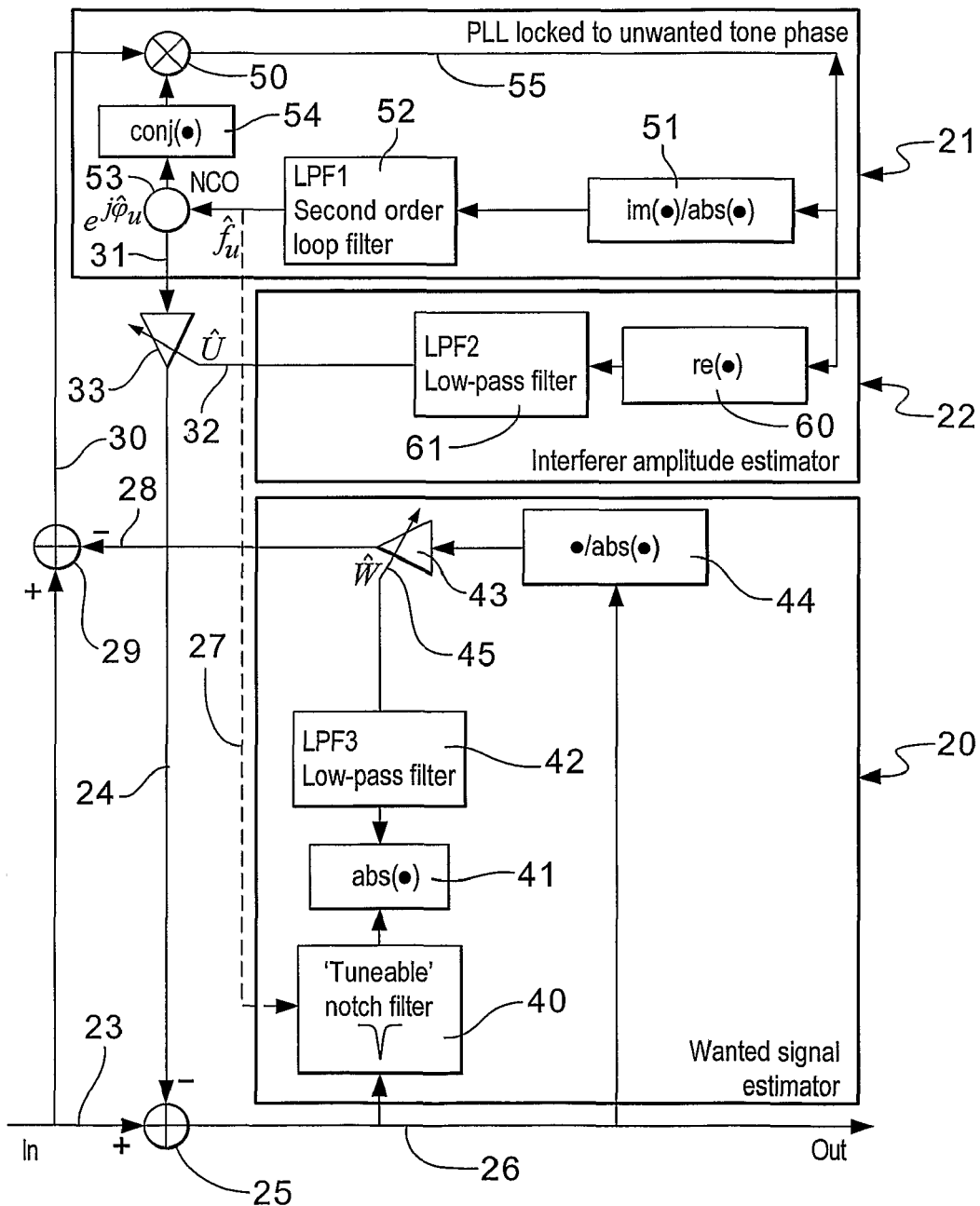
FIG. 2 shows the tone rejection block of FIG. 1 in more detail.

FIG. 1 shows a radio receiver device of a generally typical design, but which includes the tone rejection block of FIG. 2. The tone rejection block takes a received signal as input and subtracts from it a tone cancellation signal to form an output. In order to form the tone cancellation signal the tone rejection block forms and maintains adaptive estimates of the phase and amplitude of an unwanted tone and of the wanted signal amplitude. Based on those estimates it forms the tone cancellation signal. The tone cancellation signal is formed such that when it is subtracted from the received signal, this results in at least partially cancelling the tone interferer present in the received signal.

The radio receiver device of FIG. 1 comprises a housing 1 which encloses the radio receiver 2 and hardware for other functions which is shown illustratively at 3 and 4. The other functions could, for example, be digital signal processors, display drivers, or receivers or transmitters for other radio signals. The radio receiver 2 comprises an antenna 5. The output of the antenna passes to a bandpass filter 6 and an amplifier 7. It is then mixed in mixer 8 with a tuning signal from a tuning oscillator block 9, and then passes through the IF filter/amplifier 10 to form an intermediate frequency signal. That signal is fed as input to the tone rejection block 11. The output of the tone rejection block passes to an FM demodulator 12. The output of demodulator 12 passes to another function, for example an audio amplification and output stage 3. In this example the device is a portable device and is powered by a battery 14.

The tone rejection block is located in the receive chain, in-between the IF filter/amplifier and the demodulator. It is preferred that the tone rejection block be implemented with digital processing, operating on discrete-time signals represented numerically. To allow this to be done an analog to digital converter should precede the tone rejection block in the receive chain. For example an analog to digital converter may be located in-between blocks 10 and 11 of FIG. 1. The tone rejection block could however be arranged to operate on analog signals.

Referring now to FIG. 2, the tone rejection block comprises a signal estimator 20, a phase lock loop 21 and an interferer amplitude estimator 22. The input signal to the tone rejection block is applied at 23. In a manner that will be described below the circuitry of the tone rejection block generates a tone cancellation signal on line 24. That signal is subtracted from the input signal by subtractor 25 so as to form an output signal at 26.

Broadly, the tone cancellation signal is generated as follows. The signal estimator 20 takes as input the current output signal at 26 and an estimate of the frequency of the interfering tone which it receives from the PLL on line 27. Based on those signals it forms at line 28 an estimate of the wanted signal with the unwanted tone interferer filtered from it. That estimate is subtracted from the input signal in subtractor 29, before the estimates of the phase, frequency and amplitude of the unwanted tone are derived from it. This forms an input at 30 to the PLL which represents a first estimate of the unwanted tone signal. The PLL locks on to the phase and frequency of the unwanted interfering tone in the signal at 30. A signal having that phase and frequency is output from the PLL at 31. The tone interferer amplitude estimator 22 forms a signal at 32 which is representative of the estimated amplitude of the interferer, and that signal is used to control an amplifier 33. The amplifier 33 amplifies the tone signal at 31 in accordance with the amplitude estimate at 32 to form the tone cancellation signal at 24. Instead of this approach the subtractor 25 could be controlled so that the strengths of the signals at 31 and 23 as combined are in accordance with the estimate of interferer amplitude relative to the input signal strength.

The signal estimator 20 is a highly significant component of this invention. Removing an estimate of the wanted signal from the input signal before it is applied to the PLL 21 can substantially improve performance by reducing the influence of the wanted signal on the interferer phase and amplitude estimates. The signal estimator 20 comprises a tunable notch filter 40, an absolute value unit 41 a low pass filter 42, a variable gain amplifier 43 and a modulus normalisation unit 44. It may also be considered to include the subtractor 29. The tunable notch filter applies a narrow notch filter centred on the unwanted tone frequency indicated by the frequency estimate signal at 27 from the PLL. The output signal at 26 is filtered by this filter to remove substantially all the component of the output signal that is at the frequency at which the tone interferer is estimated to be. This may also remove some of the wanted signal, but that is only significant if a substantial proportion of the total power of the wanted signal were to be removed. If necessary this can be addressed by the amplitude adaptation control described, below. The output of the notch filter 40 is applied to unit 41 which outputs the absolute value of the filtered signal. The output of unit 41 is low-pass filtered by low-pass filter 42. The output of low-pass filter 42 is the wanted signal amplitude estimate $\hat{W}$; it is applied to the control input of amplifier 43 and controls the degree of amplification applied by amplifier 43. In parallel, unit 44 applies an x/abs(x) function to the output signal at 26 thus normalising its modulus to one, and the output of unit 44 is applied as input to the amplifier 43. The output of the amplifier 43 forms the estimate of the wanted signal ($\hat{W}e^{jw}$) at 28.

In the converged state, subtracting the estimate of the wanted signal $\hat{W}e^{jw}$ from the input signal reduces disturbances of the estimates of the amplitude and phase of the unwanted tone. This is particularly beneficial to the quality of these estimates when the wanted signal contains significant power close to the frequency of the unwanted tone.

The notch filter 40 is intended to prevent imperfect unwanted tone rejection from influencing the wanted signal amplitude estimate $\hat{W}$.

The phase lock loop 21 comprises a mixer 50, an imaginary-part discriminator 51, a second-order loop filter 52, an oscillator 53 and a conjugation unit 54. The input to the PLL at 30 is coherently mixed with the phase locked signal derived from the oscillator 53 to form a signal at 55. The imaginary part of the signal at 55 is normalised relative to the modulus of the signal at 55 by discriminator 51. The output of unit 51 is applied to the input of filter 52 and filtered to form the signal ($\hat{f}_u$) at 27 which constitutes an estimate of the frequency of the unwanted tone. That signal controls the frequency of the oscillator 53, which is arranged to generate a signal of that frequency. The output of the oscillator is applied to unit 54, which determines its complex conjugate. The output of the unit 54 is what is mixed with the signal at 30. Aside from the implementation described here, the PLL 21 can be implemented in any suitable way. Conveniently the signal at 27 is digital and the oscillator 53 is digitally controlled, but the signal at 27 could be an analog signal and the oscillator could be voltage controlled. Most conveniently the PLL is a numeric PLL.

It is common for the unwanted tone frequency to be known with good accuracy. To minimise convergence time, it is preferred to make use of this a priori knowledge of the unwanted tone frequency by constraining the frequency estimate at 27 within a range centred on the expected unwanted tone frequency. This is achieved by setting the free-running frequency of the PLL to be equal to the expected unwanted tone frequency. The free-running frequency of the PLL is therefore preferably programmable. Using a PLL allows locking to unwanted tones that have a frequency offset from the expected value. This is useful when the FM demodulator and the interfering tone do not have the same clock reference. It also avoids any need for high precision in programming the expected unwanted tone frequency. If the frequency of the interferer were precisely known then the PLL could be locked to the frequency of the interferer, and could adapt only to its phase.

The unwanted tone amplitude estimator 22 comprises a real part extraction unit 60 and a low-pass filter 61. The signal at 55, is applied to the input of unit 60, which outputs a signal that represents the real part of the signal at 55. That is low-pass filtered by filter 61 to form the signal at 32 that is representative of the estimated amplitude of the unwanted tone.

The output from oscillator 53 is a signal of the frequency and phase that the unwanted tone has been estimated to have. That is applied to the signal input of amplifier 33. The signal at 32 that is representative of the estimated amplitude of the unwanted tone is applied to the control input of the amplifier, and the amplifier is arranged to amplify the input signal by an amount that is dependent on the signal applied to the control input. Accordingly, the signal $\hat{U}e^{ju}$ output at 24 has the frequency, phase and amplitude that the unwanted tone has been estimated to have.

The filters 40, 52, 61 and 42 can conveniently be implemented with digital processing, but could each be implemented in analog if required.

Filter 40 can be implemented as [z transform given]:

$$\frac{1 - \exp(j2\pi \hat{f}_u / FS)z^{-1}}{1 - (1-\varepsilon)\exp(j2\pi \hat{f}_u / FS)z^{-1}},$$

where $\hat{f}_u$ is the unwanted tone frequency estimate, FS is the sampling frequency and $\epsilon$ is a small positive number, for example $\epsilon = 1/128$.

The loop filter 52 can be implemented with digital processing as [z transform given]:

$$\frac{1 - (1-\varepsilon)z^{-1}}{1 - z^{-1}},$$

where $\epsilon$ is a small positive number, for example $\epsilon = 1/128$.

The amplitude estimate filters 61 and 42 can be implemented with digital processing as [z transform given]:

$$\frac{b_0}{1 - a_1 z^{-1} + a_2 z^{-2}},$$

where $b_0 = 2^{-17}$, $a_1 = 2 - 2^{-8} - 2^{-11} + 2^{-17}$, $a_2 = 1 - 2^{-8} - 2^{-11} + 2^{-16}$ The operation of the tone rejection arrangement of FIG. 2 has been simulated taking the wanted signal as being an FM stereo broadcast signal with L=R (i.e. stereo balanced), 1 kHz audio modulation and 22.5 kHz frequency deviation. In these simulations the scheme has been found to converge for at least unwanted tone amplitudes between −60 dB and +60 dB relative to the wanted signal amplitude and unwanted tone frequencies between −100 Hz and +100 Hz of the expected tone frequency that the free-running frequency of the PLL is programmed for.

It is possible for the frequency of an interfering tone to be precisely in the centre of an FM channel that is desired to be received. For example, this would happen if the interfering tone is a harmonic of a clock whose frequency expressed in MHz is integer. A problem can arise then because FM broadcasts have low modulation indices at times when their modulating audio signal is quiet. For example, speech broadcasts have regular such audio pauses. During these pauses the FM carrier is only modulated by the pilot tone (for stereo broadcasts) or not at all (for mono broadcasts), and in any case most of its power is at the carrier frequency, collocated with the unwanted tone for lengthy periods of time. The tone rejection algorithm could then diverge, mistaking the carrier component of the wanted signal as part of the unwanted signal.

One approach to inhibiting this behaviour is to slow down the adaptation speed of the tone rejection block. In a preferred embodiment the time taken by the tone rejection circuit to converge could be 10 ms, but this could be increased to 1 s or more in order to inhibit the loop from locking on to the carrier. However, this route is not preferred because it increases the time that the loop takes to converge.

A preferred alternative route is to freeze the wanted signal estimate at 45 and the tone amplitude estimate at 32 when tone rejection lock is achieved and the modulation index of the wanted signal is below a certain threshold. Meanwhile the unwanted tone PLL is allowed to run continuously at its normal rate.

Figure 3:
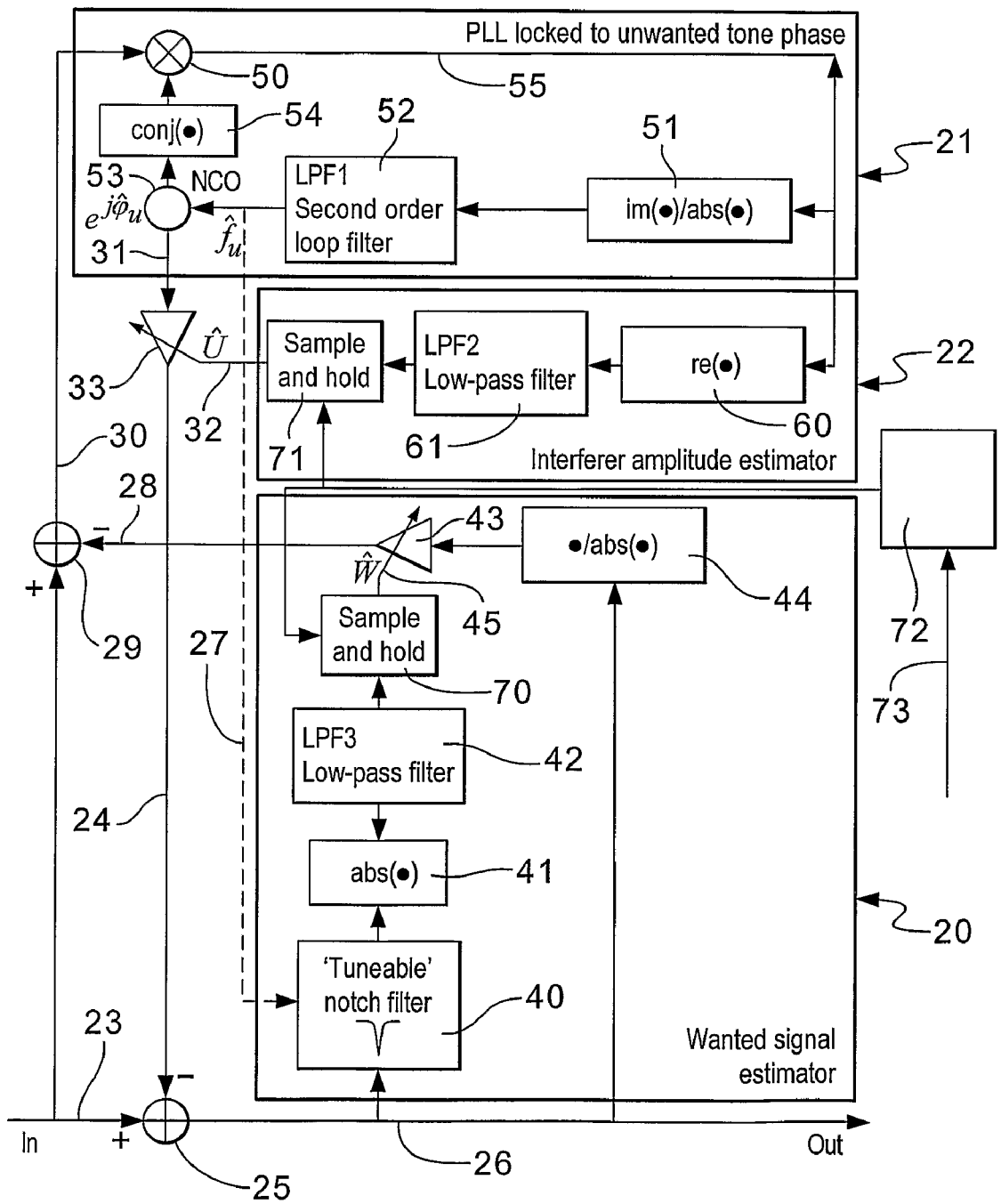
FIG. 3 illustrates an alternative tone rejection block.

FIG. 3 shows a modified tone rejection block that implements this route. The tone rejection block of FIG. 3 is the same as that of FIG. 2 except that it includes sample-and-hold units 70, 71 and an amplitude adaptation control unit 72. The amplitude adaptation control unit 72 monitors the lock state of the tone rejection block and the modulation index of the wanted signal at 26. When the tone rejection block is in the locked state and the modulation index of the wanted signal at 26 falls below a threshold pre-set in unit 72, the amplitude adaptation control unit signals the sample-and-hold units 70, 71 to lock the signals at 45 and 32 at their current values. Otherwise the units 70, 71 allow signals applied to their inputs to pass through unaltered. Either of the units 70, 71 could be omitted, but it is more preferred to have both. In a digital implementation, freezing the amplitude estimates may be conveniently implemented by stopping the clock to filter units 42 and 61 while unit 72 indicates that tone rejection lock is achieved and the wanted signal has a low modulation index.

Figure 4:
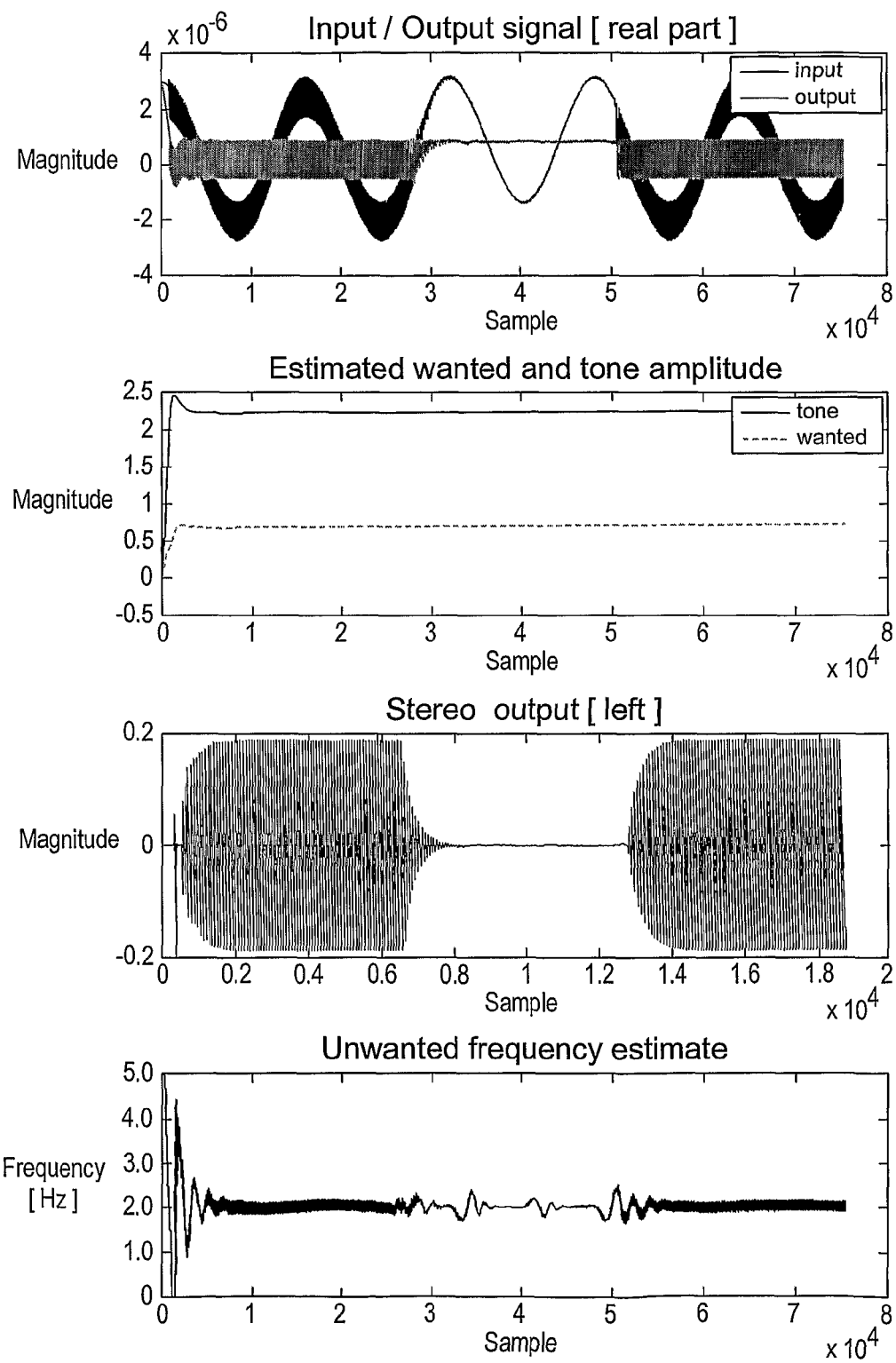
FIG. 4 illustrates tone rejection behaviour in a period of low-level audio activity.

FIG. 4 shows the behaviour of the tone rejection algorithm when there is a period of silence in the FM audio broadcast being received. The tone to wanted signal ratio is 10 dB. The unwanted tone is at a 20 Hz offset from the carrier frequency. The wanted and tone amplitude estimates are frozen at sample 25000. The simulation shows no substantial artefact in the output audio.

In this approach the adaptation of amplitude estimates should be stopped when the modulation index of the wanted signal is small, but only if the tone rejection algorithm has already converged (has achieved lock). Otherwise it is possible to have an unrejected strong blocking tone interferer making the modulation index of the signal at 26 appear small. For FM stereo broadcasts, the frequency deviation in the 'Left+Right' channel of the FM stereo multiplex is a measure of the modulation index, and detection of pilot subcarrier can be used as an indication that tone rejection lock is achieved. For this purpose the modulation index detector 72 can receive inputs as shown at 73 from the FM stereo multiplex demodulator. Therefore a scheme for adapting the amplitude estimates when receiving an FM stereo broadcast signal is:

1. Adapt whenever the mean frequency deviation in the 'Left+Right' channel of the FM stereo multiplex being received is greater than a pre-set (programmable) threshold (e.g. greater than 10 kHz).
2. Also adapt whenever a pilot subcarrier is not detected in the wanted signal.
3. Otherwise, do not adapt the amplitude estimates.

The preferred implementation of the tone rejection block of FIG. 2 is using dedicated digital hardware, but it could be implemented in various other ways. For example, the tone rejection block can be performed entirely or partially by a suitably-programmed DSP. The PLL and/or the other components of the block could be implemented using individual blocks in digital or analog.

Instead of the PLL detecting the frequency of the interferer, the frequency could be pre-set into the system. This may be convenient where the frequency of the interferer is precisely known in advance, for example when the interferer is due to a component that has the same clock reference as the receiver.

The tone rejection arrangement described above could be used in applications other than radio receivers, to separate a wanted signal from a tone. For example, it could be inserted in analog signal transmission lines to inhibit pick-up of interferers.

Multiple tone rejection blocks of the type described above could be connected in series to reject multiple tones at different frequencies.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. An interference rejection unit for at least partially rejecting an interferer from an input signal, the unit comprising:
    an interferer detector for detecting the phase of an interferer in the input signal;
    a signal generator for generating a cancellation signal in dependence on the phase detected by the interferer detector;
    a signal combiner for combining the input signal with the cancellation signal to generate an output signal in which the interferer is at least partially cancelled from the input signal;
    a wanted signal estimator for forming a first estimate signal by filtering the input signal or a signal generated in dependence on the input signal to selectively reject therefrom signals of the form of the interferer; and
    an interferer estimator for forming a second estimate signal by cancelling the first estimate signal from the input signal;
    and wherein the interferer detector is arranged to detect the phase of the interferer in the input signal by detecting the phase of the interferer in the second estimate signal.

2. An interference rejection unit as claimed in claim 1 wherein the wanted signal estimator is arranged to form an estimate of the amplitude of the output signal and to form the first estimate signal such that its amplitude is dependent on the estimate of the amplitude of the output signal.

3. An interference rejection unit as claimed in claim 2, wherein the wanted signal estimator is arranged to form the first estimate signal such that its amplitude is equal to the estimated amplitude of the output signal.

4. An interference rejection unit as claimed in claim 2, wherein the interference rejection unit is arranged to, whilst the modulation index of the input signal is below a predetermined threshold, hold the estimate of the amplitude of the output signal at a constant value.

5. A signal receiver comprising an interference rejection unit as claimed in claim 4, wherein the receiver includes a carrier detector for detecting a wanted carrier in the output signal and the interference rejection unit is arranged to take the modulation index of the input signal to be below the predetermined threshold when the carrier detector does not detect a wanted carrier in the output signal.

6. An interference rejection unit as claimed in claim 1, wherein the interferer detector is capable of detecting the frequency of the interferer in the input signal.

7. An interference rejection unit as claimed in claim 6, wherein the signal generator is arranged to generate the cancellation signal at the frequency detected by the interferer detector.

8. An interference rejection unit as claimed in claim 1, wherein the interferer detector is arranged to detect the frequency of the interferer in the input signal by detecting the frequency of the interferer in the second estimate signal.

9. An interference rejection unit as claimed in claim 1, wherein the wanted signal estimator comprises a filter for filtering the input signal or the signal generated in dependence on the input signal to selectively reject therefrom signals of the form of the interferer, the filter being an adjustable notch filter arranged to selectively filter signals at the frequency detected by the interferer detector.

10. An interference rejection unit as claimed in claim 1, wherein the interferer detector is capable of detecting the amplitude of the interferer in the input signal.

11. An interference rejection unit as claimed in claim 10, wherein the interferer detector is arranged to detect the amplitude of the interferer in the input signal by detecting the amplitude of the interferer in the second estimate signal.

12. An interference rejection unit as claimed in claim 10, wherein the signal generator is arranged to combine the input signal and the cancellation signal at relative strengths dependent on the amplitude detected by the interferer detector.

13. An interference rejection unit as claimed in claim 1, wherein the input signal contains a frequency modulated signal.

14. An interference rejection unit as claimed in claim 13, wherein the interference rejection unit is arranged to, whilst the modulation index of the input signal is below a predetermined threshold, hold the relative strengths at which the input signal and the cancellation signal are combined at a constant value.

15. An interference rejection unit as claimed in claim 1, wherein the interferer is a narrowband interferer.

16. A signal receiver comprising an interference rejection unit as claimed in claim 1.

17. A method for operating an interference rejection unit for at least partially rejecting an interferer from an input signal, the method comprising:
  detecting the phase of an interferer in the input signal;
  generating a cancellation signal in dependence on the phase detected by the interferer detector;
  combining the input signal with the cancellation signal to generate an output signal in which the interferer is at least partially cancelled from the input signal;
  forming a first estimate signal by filtering the input signal or a signal generated in dependence on the input signal to selectively reject therefrom signals of the form of the interferer; and
  forming a second estimate signal by cancelling the first estimate signal from the input signal;
  the step of detecting the phase of an interferer in the input signal comprising detecting the phase of the interferer in the second estimate signal.

* * * * *